United States Patent
Schmitt et al.

(10) Patent No.: US 7,172,777 B2
(45) Date of Patent: Feb. 6, 2007

(54) POWDER FOR PREPARATION OF A PROBIOTIC YOGURT FOOD

(75) Inventors: Gerhard Schmitt, Bensheim (DE); Franz Fritzmeier, Gunzenhausen (DE); Horst Schwietz, Allersberg (DE)

(73) Assignee: PM-International AG, Luxembourg (LU)

( * ) Notice: Subject to any disclaimer, the term of this patent is extended or adjusted under 35 U.S.C. 154(b) by 312 days.

(21) Appl. No.: 10/942,826

(22) Filed: Sep. 17, 2004

(65) Prior Publication Data

US 2005/0064067 A1    Mar. 24, 2005

(30) Foreign Application Priority Data

Sep. 18, 2003    (EP) .................................. 03021216

(51) Int. Cl.
  *C12N 1/38*    (2006.01)
  *A23C 9/123*   (2006.01)

(52) U.S. Cl. .......................... 426/43; 426/71; 426/583; 435/252.9

(58) Field of Classification Search .................. 426/34, 426/41, 43, 71, 583; 435/252.9
See application file for complete search history.

(56) References Cited

U.S. PATENT DOCUMENTS

| | | |
|---|---|---|
| 5,145,698 A | 9/1992 | Cajigas |
| 7,071,384 B2 * | 7/2006 | Howard et al. ............. 800/298 |

FOREIGN PATENT DOCUMENTS

| | | |
|---|---|---|
| EP | 0 231 643 A | 8/1987 |
| EP | 1 269 857 A | 1/2003 |
| FR | 2 750 298 A | 1/1998 |
| JP | 59 051747 A | 3/1984 |

* cited by examiner

*Primary Examiner*—Keith Hendricks
(74) *Attorney, Agent, or Firm*—Jean C. Edwards, Esq.; Akerman Senterfitt

(57) ABSTRACT

The invention relates to a powder for preparation of a probiotic yogurt food. The powder contains probiotic cultures with a prespecified proportion of living probiotic lactic-acid bacteria and a thermogenetic-lipolytic resorption-enhancing agent, in particular pepper extract, to intensify the resorptive processes in the intestine, as well as a capillary-dilating agent, in particular nicotinic acid, to achieve dilation of the capillaries in the intestinal tract.

12 Claims, No Drawings

POWDER FOR PREPARATION OF A PROBIOTIC YOGURT FOOD

This application claims priority from European Patent Application No. 03 021 216.1, filed Sep. 18, 2003, the entire contents of which are herein incorporated by reference to the extent allowed by law.

The invention relates to a powder to be used as a starter culture for preparation of a probiotic yogurt food, containing probiotic cultures with a prespecified proportion of living probiotic lactic-acid bacteria.

BACKGROUND OF THE INVENTION

Probiotic lactic-acid bacteria, which at present are often artificially added to yogurt foods, can have a number of positive effects on health if they are alive when they enter the digestive tract and can attach themselves therein for the longest possible time. Their action is to inhibit colonization by other microorganisms, some of which are deleterious to health, and to establish a desirable, positive intestinal flora. Hence the effectiveness of the probiotic cultures is increased when they are transported into the intestine as efficiently as possible and achieve the highest possible rate of attachment to its walls.

SUMMARY OF THE INVENTION

The objective of the present invention is thus to create a powder to be used as a starter culture for preparation of a probiotic yogurt food such that in the intestine, i.e. the digestive tract, the probiotic cultures can exert their action with still higher effectiveness.

This objective is achieved with a powder for preparation of a probiotic yogurt food which contains priobiotic cultures with a prespecified proportion of living probiotic lactic-acid bacteria; a thermogenic-lipolytic resorption-enchancing agent, in particular pepper extract, to intensify the resorptive processes in the intestine, as well as a capillary-dilating agent, in particular nicotinic acid, to achieve dilation of the capillaries in the intestinal tract.

DESCRIPTION OF THE INVENTION

It is a central idea of the present invention that the powder for use in preparing a probiotic yogurt food contains a thermogenetic-lipolytic resorption-enhancing agent, in particular pepper extract, to facilitate the resorptive processes in the intestine, as well as a capillary-dilating agent, in particular nicotinic acid, to achieve dilation of the capillaries in the intestinal tract. The plant *Piper nigrum* contains the alkaloid piperin, which in the form of pepper extract has a thermogenic and/or lipolytic and/or resorption-enhancing effect. The capillary-dilating agent, in particular nicotinic acid, causes dilation of the capillaries in the intestinal tract, an action that also promotes resorption and improves oxygen uptake as well as the release of metabolic end products.

In combination with probiotic cultures in a yogurt food it has been found, surprisingly, that the simultaneous admixture of the thermogenetic-lipolytic resorption-enhancing agent, in particular pepper extract, and of the capillary-dilating agent, in particular nicotinic acid, increases the effectiveness of the probiotic cultures, in particular their activity and adhesion in the intestinal region, in a synergistic manner.

A well-balanced action of the probiotic cultures results when the probiotic cultures comprise at least two, preferably at least three, and especially preferably at least five different cultures (bacterial strains). The probiotic cultures then supplement one another to some extent, and can also provide mutual support in certain constellations.

The probiotic cultures can consist of a single culture or a combination selected from two or more cultures in the group that comprises *Lactobacillus acidophilus, Lactobacillus bulgaricus, Lactobacillus delbruckii*, species of *Bifidobacterium*, and *Streptococcus thermophilus*. With these specific cultures good results have been obtained, above all with the admixture of a thermogenetic-lipolytic resorption-enhancing agent, in particular pepper extract, and a capillary-dilating agent, in particular nicotinic acid.

Preferably prebiotics are also added to the powder, in particular inulin and/or lactose, to support the probiotic cultures. The prebiotics serve as accessory materials and nutrients for the probiotic cultures and assist their transport into the intestinal tract as well as helping them to thrive and remain active while in the intestinal tract.

In a preferred embodiment the powder further comprises whey protein, in particular with a high proportion of B vitamins. The B vitamins, in particular vitamins B1, B2, B6 and B12, are vitally necessary for many bodily functions; an inadequate supply causes deficiency symptoms.

In another embodiment the powder contains calcium and/or phosphorus, one function of which is to support bone structure. In still another embodiment the powder can contain a prespecified amount of oligofructose, on one hand as a ballast material and on the other hand to sluice the probiotic cultures as well as possible through the acidic medium of the stomach.

In an especially preferred embodiment the powder according to the present invention comprises probiotic bacteria in an amount, with reference to the finished yogurt food, of over 10 million/g, preferably over 50 million/g, particularly preferably over 100 million/g.

An especially advantageous concentration of the thermogenetic-lipolytic resorption-enhancing agent, in particular the pepper extract, per 100 ml of finished yogurt food is in a range from 0.1 mg to 10 mg, preferably about 1.0 mg.

An especially advantageous concentration of the capillary-dilating agent, in particular the nicotinic acid, per 100 ml of finished yogurt food is in a range from 2 mg to 20 mg, preferably about 10 mg. The weakly acidic taste does not cause any unpleasant change in the taste of the yogurt food produced with the powder in accordance with the invention.

In an especially preferred embodiment the powder for preparation of a probiotic yogurt food is enclosed in a foil bag that excludes light and oxygen. This feature ensures that the powder will keep for a long time, and in particular that the freeze-dried probiotic cultures will retain a high level of activity.

Also in accordance with the invention, a probiotic yogurt food is claimed that is produced from a mixture of the powder according to one of the claims 1 to 11 together with milk, in particular homogenized ultra-heat-treated milk (UHT-milk), after a generation time of some hours. For this purpose a special preparation system can be employed, which is adapted to the powder in accordance with the invention. This preparation system consists of an inner pot, within which the powder is preferably stirred into a specific quantity of UHT-milk, preferably a liter. The outer pot is filled with a prespecified amount of boiling water. The inner pot containing the yogurt ingredients is warmed by the boiling-water-filled outer pot, and the thermal gradients in the inner pot produce a convection effect that prevents the temperature-sensitive probiotic cultures in the hot marginal regions of the inner pot from being damaged. Because of the convection effect, all the bacteria reach their temperature optimum during the preferably eight- to 10-hour generation time. The finished yogurt can be kept in the refrigerator for at least a week, while maintaining a high bacteria count.

The health-promoting actions of the probiotic cultures are decisively enhanced, in a surprising manner, by the thermogenic and/or lipolytic and/or resorption-enhancing effect of the thermogenetic-lipolytic resorption-enhancing agent, in particular pepper extract, as well as the vasodilator effect with metabolic activation produced by the capillary-dilating agent, in particular the nicotinic acid.

The invention claimed is:

1. Powder for preparation of a probiotic yogurt, containing:
   probiotic cultures with a proportion of living probiotic lactic-acid bacteria,
   a thermogenic-lipolytic resorption-enhancing agent, which is a pepper extract, to intensify a resorptive process in an intestine, and
   a capillary-dilating agent which is nicotinc acid, to achieve dilation of capillaries in an intestinal tract.

2. Powder according to claim 1, wherein the probiotic cultures comprise at least two different cultures of bacterial strains.

3. Powder according to claim 1, wherein the probiotic cultures comprise at least one of *Lactobacillus acidophilus*, *Lactobacillus bulgaricus*, *Lactobacillus delbruckii*, *Bifidobacterium* species, or *Streptococcus thermophilus*.

4. Powder according to claim 1, further comprising at least one of the prebiotics inulin or lactose, to support the probiotic cultures.

5. Powder according to claim 1, further comprising whey protein.

6. Powder according to claim 1, further comprising at least one of calcium or phosphorus.

7. Powder according to claim 1, further comprising oligofructose.

8. Powder according to claim 1, wherein the number of probiotic bacteria with reference to a finished yogurt is at least 10 million/g yogurt.

9. Powder according to claim 1, wherein per 100 ml finished yogurt pepper extract is contained in a concentration of 0.1 mg to 10 mg.

10. Powder according to claim 1, wherein per 100 ml finished yogurt nicotinic acid is contained in a concentration of 2 mg to 20 mg.

11. Powder according to claim 1, wherein the powder is enclosed in a foil bag that inhibits a passage of light and oxygen.

12. Probiotic yogurt produced from a mixture of the powder according to claim 1 and milk.

* * * * *